US012354375B1

(12) United States Patent
Li et al.

(10) Patent No.: US 12,354,375 B1
(45) Date of Patent: Jul. 8, 2025

(54) MULTIMODAL PERCEPTION DECISION-MAKING METHOD AND APPARATUS FOR AUTONOMOUS DRIVING BASED ON LARGE LANGUAGE MODEL

(71) Applicant: Beijing University of Chemical Technology, Beijing (CN)

(72) Inventors: Zhiwei Li, Beijing (CN); Tingzhen Zhang, Beijing (CN); Haohan Wu, Beijing (CN); Weizheng Zhang, Beijing (CN); Weiye Xiao, Beijing (CN); Kunfeng Wang, Beijing (CN); Wei Zhang, Beijing (CN); Tianyu Shen, Beijing (CN); Li Wang, Beijing (CN); Qifan Tan, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 19/026,564

(22) Filed: Jan. 17, 2025

(30) Foreign Application Priority Data

Mar. 4, 2024 (CN) .......................... 202410243702.6

(51) Int. Cl.
*G06V 20/58* (2022.01)
*G06T 5/50* (2006.01)
*G06T 7/10* (2017.01)
*G06V 10/25* (2022.01)
(Continued)

(52) U.S. Cl.
CPC ............. *G06V 20/582* (2022.01); *G06T 5/50* (2013.01); *G06T 7/10* (2017.01); *G06V 10/25* (2022.01); *G06V 10/771* (2022.01); *G06V 10/806* (2022.01); *G06T 2207/10024* (2013.01); *G06T 2207/10048* (2013.01); *G06T 2207/20221* (2013.01); *G06V 2201/07* (2022.01)

(58) Field of Classification Search
None
See application file for complete search history.

(56) References Cited

FOREIGN PATENT DOCUMENTS

CN   117037115 A  * 11/2023
CN   117372983 A  *  1/2024  ........... G06N 3/0455
(Continued)

*Primary Examiner* — James M Anderson, II
(74) *Attorney, Agent, or Firm* — Bayramoglu Law Offices LLC

(57) ABSTRACT

A multimodal perception decision-making method for autonomous driving based on a large language model includes: acquiring an RGB image and an infrared image of a target area at current time; processing the RGB image using a target detection model to obtain a predicted bounding box and a corresponding target detection category; processing the infrared image and the predicted bounding box and the corresponding target detection categories by using a segmentation model to obtain a target mask image; fusing the RGB image, the target mask image and the infrared image using a fusion model to obtain a fused feature map; performing fusion processing on first prompt information representing a user intent, second prompt information representing target detection category priorities, and the fused feature map, using a large Vision-Language Model to obtain textual information; and processing the textual information using a large natural language model to obtain a perception decision-making result.

15 Claims, 4 Drawing Sheets

(51) Int. Cl.
*G06V 10/771* (2022.01)
*G06V 10/80* (2022.01)

(56) References Cited

FOREIGN PATENT DOCUMENTS

| WO | WO-2022134464 A1 | * | 6/2022 | |
|----|------------------|---|--------|----------|
| WO | WO-2023207437 A1 | * | 11/2023 | ............. G06F 30/18 |

* cited by examiner

MULTIMODAL PERCEPTION DECISION-MAKING METHOD AND APPARATUS FOR AUTONOMOUS DRIVING BASED ON LARGE LANGUAGE MODEL

CROSS REFERENCE TO THE RELATED APPLICATIONS

This application is based upon and claims priority to Chinese Patent Application No. 202410243702.6, filed on Mar. 4, 2024, the entire contents of which are incorporated herein by reference.

TECHNICAL FIELD

The present application relates to the technical field of autonomous driving, and in particular to a multimodal perception decision-making method and apparatus for autonomous driving based on a large language model (LLM).

BACKGROUND

The development of autonomous driving is inherently tied to safety concerns. Accurately perceiving obstacles during driving, maintaining an appropriate safe distance from them, and making correct safety decisions have always been critical issues in the field of autonomous driving.

In road scenarios, targets perceived that influence decision-making are diverse, and road conditions are highly uncertain. How to allocate different levels of "attention" to various targets has been a technical challenge. For example, if a child suddenly appears on the road, a vehicle must prioritize avoiding the child over any other non-human obstacles.

No effective solutions have been proposed yet to address the problems described above.

SUMMARY

In view of this, the present application provides a multimodal perception decision-making method and apparatus for autonomous driving based on an LLM to solve the technical problems described above.

In a first aspect, embodiments of the present application provide a multimodal perception decision-making method for autonomous driving based on an LLM, including:
acquiring a red green blue (RGB) image and an infrared image of a target area at current time;
processing the RGB image using a target detection model to obtain a predicted bounding box and a corresponding target detection category;
processing the infrared image and the predicted bounding box and the corresponding target detection categories by using a segmentation model to obtain a target mask image;
fusing the RGB image, the target mask image and the infrared image using a fusion model to obtain a fused feature map;
performing fusion processing on first prompt information representing a user intent, second prompt information representing target detection category priorities, and the fused feature map, using a large Vision-Language Model to obtain textual information; and
processing the textual information using a large natural language model to obtain a perception decision-making result.

Further, the segmentation model includes an image encoder, a prompt encoder and a mask decoder; and
processing the infrared image and the predicted bounding box and the corresponding target detection categories using a segmentation model to obtain a target mask image includes:
processing the infrared image using the image encoder to obtain image embedding features;
processing the predicted bounding box and the corresponding target detection categories using the prompt encoder to obtain prompt embedding features; and
processing the image embedding features and the prompt embedding features using the mask decoder to obtain a target mask image containing a mask and semantic labels.

Further, the fusion model includes: a first convolutional layer, a second convolutional layer, a third convolutional layer, a fourth convolutional layer, a fifth convolutional layer, a sixth convolutional layer, a seventh convolutional layer, and an addition unit; and
fusing the RGB image, the target mask image, and the infrared image using a fusion model to obtain a fused feature map includes:
processing the infrared image using the first convolutional layer to obtain a first feature map;
processing the target mask image using the second convolutional layer to obtain a second feature map;
processing the RGB image using the third convolutional layer to obtain a third feature map;
processing the first feature map, the second feature map and the third feature map using the fourth convolutional layer to obtain a fourth feature map;
processing the fourth feature map using the fifth convolutional layer to obtain a fifth feature map;
processing the fifth feature map using the sixth convolutional layer to obtain a sixth feature map;
processing the RGB image, the target mask image and the infrared image using the seventh convolutional layer to obtain a seventh feature map; and
adding together the sixth feature map and the seventh feature map using the addition unit to obtain the fused feature map.

Further, the target detection category priorities are: traffic participants, road signs and traffic signals, and road obstacles.

Further, content of the textual information includes image text descriptions sorted according to the target detection category priorities.

Further, the perception decision-making result includes: a vehicle control signal and corresponding explanatory information.

Further, the method further includes a step of training the fusion module.

In a second aspect, embodiments of the present application provide a multimodal perception decision-making apparatus for autonomous driving based on an LLM, including:
an acquisition unit configured to acquire an RGB image and an infrared image of a target area at current time;
a detection unit configured to process the RGB image using a target detection model to obtain a predicted bounding box and corresponding target detection categories;
a first processing unit configured to process the infrared image and the predicted bounding box and the corresponding target detection categories using a segmentation model to obtain a target mask image;

a fusion unit configured to fuse the RGB image, the target mask image and the infrared image using a fusion model to obtain a fused feature map;

a second processing unit configured to perform fusion processing on first prompt information representing a user intent, second prompt information representing target detection category priorities, and the fused feature map, using a large Vision-Language Model to obtain textual information; and a decision-making unit configured to process the textual information using a large natural language model to obtain a perception decision-making result.

In a third aspect, embodiments of the present application provide an electronic device, including a processor, a memory, and a computer program stored in the memory and executable on the processor, wherein when executing the computer program, the processor implements the method in embodiments of the present application.

In a fourth aspect, embodiments of the present application provide a computer readable storage medium, wherein the computer readable storage medium stores computer instructions which, when executed by a processor, implements the method in embodiments of the present application.

The present application improves the priority of traffic participants in perception decision-making of an autonomous driving vehicle, thereby enhancing the safety of the autonomous driving vehicle.

BRIEF DESCRIPTION OF THE DRAWINGS

To describe technical solutions in specific embodiments of the present application or in the prior art more clearly, a brief introduction to drawings for use in description of the specific embodiments or the prior art will be provided below. Obviously, the drawings described below represent some implementations of the present application, and for those of ordinary skill in the art, other drawings may also be obtained based on the drawings without creative work.

DETAILED DESCRIPTION OF THE EMBODIMENTS

Figure 1:
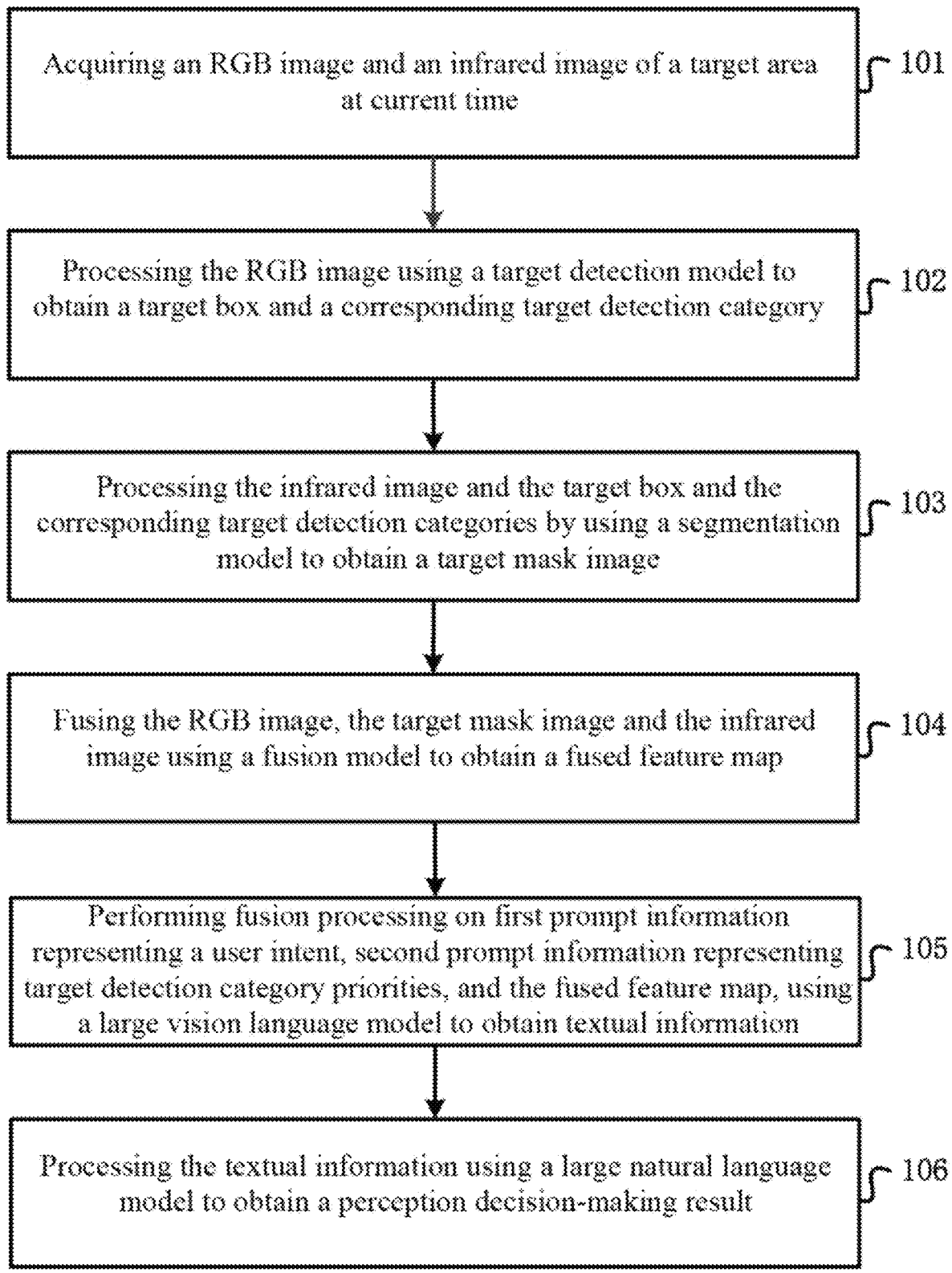
FIG. 1 is a flow diagram of a multimodal perception decision-making method for autonomous driving based on an LLM provided in embodiments of the present application.

To make the objects, technical solutions and advantages of embodiments of the present application more explicit, technical solutions in embodiments of the present application will be described below clearly and thoroughly in conjunction with drawings in embodiments of the present application. Evidently, the described embodiments represent part of, but not all of, embodiments of the present application. Components in embodiments of the present application, as generally described and shown in the drawings here, can be arranged and designed in a variety of different configurations.

Therefore, the following detailed description of embodiments of the present application provided in the drawings is not intended to limit the scope of the present application as claimed, but merely represents selected embodiments of the present application. Based on embodiments in the present application, all other embodiments obtained by those of ordinary skill in the art without creative work, fall within the scope of protection of the present application.

A brief introduction to design ideas of embodiments of the present application is provided first.

In road scenarios, targets perceived that influence decision-making are diverse, and road conditions are highly uncertain. How to allocate different levels of "attention" to various targets has been a technical challenge. For example, if a child suddenly appears on the road, a vehicle must prioritize avoiding the child over any other non-human obstacles. No effective solutions have been proposed yet to address the problem. In addition, using a single type of sensor can only collect limited information, making it difficult to meet accuracy requirements for road condition perception in autonomous driving.

To solve the above-mentioned technical problems, the high sensitivity of infrared sensors to thermal radiation information and the sensitivity of visible light sensors to background textures are considered. Infrared cameras can better perceive live targets (humans and animals). Accordingly, the present application assigns a priority order for targets, and uses multimodal fusion of an infrared image and a visible light image, thereby addressing priority-based enhancement.

Moreover, unlike traditional modular autonomous driving algorithms, end-to-end autonomous driving is adopted to coordinates a global effect. It only requires overall training, adjustment and optimization of one model to achieve performance improvement. Therefore, it can better concentrate resources and achieve functional focus. The "brain" of autonomous driving—a decision generation part—is the key to solving the long-tail problem of autonomous driving. Ordinary algorithms can only learn based on the content of training, which is limiting, and it is difficult for them to cope with special scenarios based on common sense knowledge, as humans do. Furthermore, they rely on a deep neural network to predict future driving trajectories, with a decision-making process implicitly encoded in the neural network, making it difficult to interpret. A GPT model understands common sense information about the human society. Choosing the GPT model as a decision-making center can solve the long-tailed problem of autonomous driving, but also addresses the interpretability of autonomous driving.

The present application designs a multimodal perception decision-making method for autonomous driving with high-precision perception and priority-based attention allocation, including three parts: a perception fusion part, a post-processing part, and a decision generation part. The perception part uses a currently powerful SAM model, which is combined with a semantic perception head and optimized and fine-tuned to obtain a semantic SAM model, and it achieves the effect of emphasizing live targets through multimodal fusion of an infrared image and a visual image. The post-processing part is designed with a priority prompt module to implement priority-based attention allocation and emphasis, and achieves text-to-image conversion. The decision generation part uses the GPT model as a decision core to solve the long-tail problem and achieve the effect of interpretability, so that the autonomous driving can think like a human. The present application improves the priority of traffic participants in perception decision-making of an autonomous driving vehicle, by capturing infrared images, thereby enhancing the safety of the autonomous driving vehicle.

After introduction to the application scenarios and design ideas of embodiments of the present application, the technical solutions provided in embodiments of the present application are described below.

As shown in FIG. 1, embodiments of the present application provide a multimodal perception decision-making method for autonomous driving based on an LLM, including steps as follows:

Step 101: acquiring an RGB image and an infrared image of a target area at current time;

Exemplarily, a visible light camera and an infrared sensor are mounted on an autonomous driving vehicle. The infrared sensor is used to acquire the infrared image of the target area, and the visible light camera is used to acquire the RGB image of the target area.

Step 102: processing the RGB image using a target detection model to obtain a predicted bounding box and a corresponding target detection category;

Exemplarily, a semantic part uses a DINO model. The RGB image is input into the target detection model DINO to obtain an inference result: the predicted bounding box and the target category.

Step 103: processing the infrared image and the predicted bounding box and the corresponding target detection categories using a segmentation model to obtain a target mask image;

This embodiment uses a SAM (Segment Anything Model) as the segmentation model, including an image encoder, a prompt encoder and a mask decoder, capable of outputting segmentation masks.

The predicted bounding box output from step 102 is input, as a prompt box for the SAM, into the prompt encoder of the SAM model, guiding the SAM model to perform segmentation to obtain a target mask. A target category serves to filter the SAM segmentation mask (filtering out tiny, unimportant targets).

Although the SAM has advanced the development of large models in CV, its segmentation results lack semantic meaning. In this embodiment, a semantic recognition model (DINO) is nested into the SAM large model, which is fine-tuned to become a semantic segmentation model applicable to the autonomous driving field, with its output adjusted to a required mask format.

Image encoder: Based on a scalable and powerful pre-training method, a ViT pre-trained with MAE is used, which is minimally adapted for handling high-resolution inputs. The image encoder runs once for each image, and is applied before a prompt model.

Prompt encoder: Two sets of prompts are considered: sparse (points, boxes, text) and dense (masks). Points and boxes are represented through positional encoding to generate prompt embeddings.

Mask decoder: The mask decoder effectively maps image embeddings and prompt embeddings to masks.

Specifically, this step includes:
processing the infrared image and the predicted bounding box and the corresponding target detection categories using a SAM segmentation model to obtain a target mask image, including:
processing the infrared image using the image encoder to obtain image embedding features;
processing the predicted bounding box and the corresponding target detection categories using the prompt encoder to obtain prompt embedding features; and
processing the image embedding features and the prompt embedding features using the mask decoder to obtain a target mask image containing a mask and semantic labels.

Step 104: fusing the RGB image, the target mask image and the infrared image using a fusion model to obtain a fused feature map;

High-quality fused images with infrared and visible light information contribute to intelligent and safe driving. In an infrared and visible light fused image, texture features of a visible light image are clearer, and thermal sensing capability of an infrared image allows for greater sensitivity to live targets (humans and animals). However, useless noise information in the infrared image makes the fused image unclear, leading to a loss of texture information in the visible image. Multimodal fusion can solve this problem.

Figure 2:
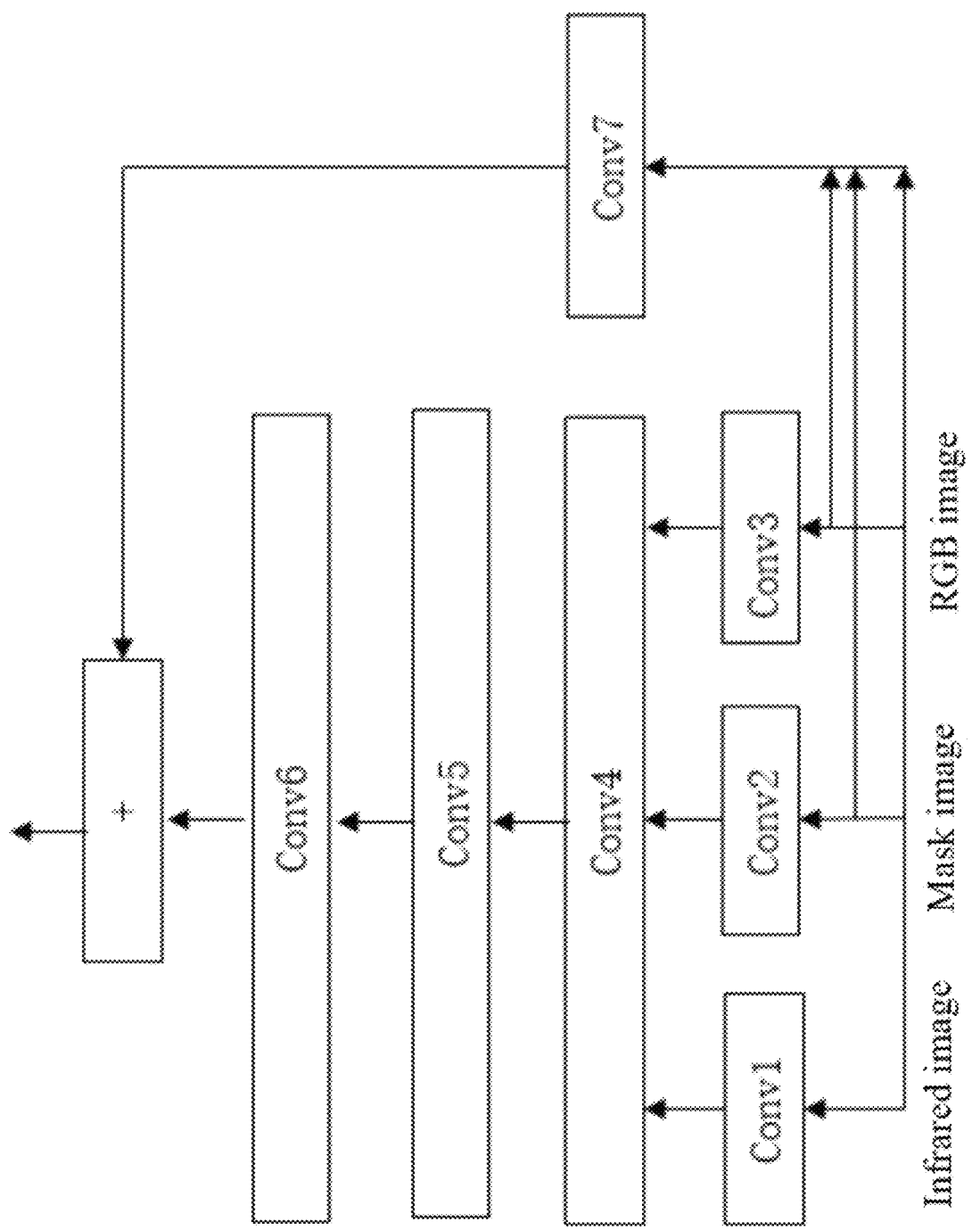
FIG. 2 is a schematic structure diagram of a fusion model provided in embodiments of the present application.

As shown in FIG. 2, the fusion model includes: a first convolutional layer (Conv1), a second convolutional layer (Conv2), a third convolutional layer (Conv3), a fourth convolutional layer (Conv4), a fifth convolutional layer (Conv5), a sixth convolutional layer (Conv6), a seventh convolutional layer (Conv7) and an addition unit (+);

fusing the RGB image, the target mask image, and the infrared image using a fusion model to obtain a fused feature map includes:
processing the infrared image using the first convolutional layer to obtain a first feature map;
processing the target mask image using the second convolutional layer to obtain a second feature map;
processing the RGB image using the third convolutional layer to obtain a third feature map;
processing the first feature map, the second feature map and the third feature map using the fourth convolutional layer to obtain a fourth feature map;
processing the fourth feature map using the fifth convolutional layer to obtain a fifth feature map;
processing the fifth feature map using the sixth convolutional layer to obtain a sixth feature map;
processing the RGB image, the target mask image and the infrared image using the seventh convolutional layer to obtain a seventh feature map; and
adding together the sixth feature map and the seventh feature map using the addition unit to obtain the fused feature map.

Step 105: performing fusion processing on first prompt information representing a user intent, second prompt information representing target detection category priorities, and the fused feature map, using a large Vision-Language Model to obtain textual information;

This embodiment uses LLaMA-Adapter V2 as a large Vision-Language Model to accomplish image-to-text conversion. Compared with a full fine-tuning paradigm adopted by Alpaca and Vicuna, the LLaMA-Adapter introduces lightweight adapters with zero initialized attention to frozen LLaMA, for parameter-efficient fine-tuning and multimodal knowledge injection. LLaMA-Adapter demonstrates the potential of using LLMs to process visual inputs; however, it still faces challenges in generalizing well to open-ended visual instructions and lags behind GPT-4. LLaMA-Adapter V2 is a parameter-efficient visual instruction model. Specifically, first, the LLaMA-Adapter is enhanced by unlocking additional learnable parameters (e.g., norms, biases, and scales), which extend the instruction-following capability across the entire LLAMA model. Second, an early fusion strategy is proposed, where only visual tokens are fed to early LLM layers, contributing to better fusion of visual knowledge. Joint training examples of image-text pairs and instruction-following data are introduced by optimizing disjoint sets of learnable parameters. This strategy effectively mitigates the interference between the two tasks of image-text alignment and instruction following, enabling powerful multimodal inference with only small image-text and instruction datasets. During inference, additional expert models (e.g., captioning/OCR systems) are integrated into the LLaMA-Adapter to further enhance its image understanding capabilities without incurring training costs. Compared to the original LLaMA-Adapter, LLaMA-Adapter V2 can execute open-ended multimodal instructions by introducing only 14M parameters into LLaMA. Therefore, the Llama adapter v2 model is chosen to accomplish this task.

In this embodiment, the target detection category priorities are: traffic participants, road signs and traffic signals, and road obstacles.

The traffic participants include other pedestrians, bicycles, ordinary automobiles or large vehicles, motorcycles, etc. These are highest-priority perception targets because they are directly related to safe driving of the vehicle. The road signs and traffic signals include traffic signs, traffic signal lights, road markings, etc. These targets are critical for the vehicle to understand traffic rules and road conditions. The road obstacles Include stones, branches, animals, etc. These obstacles may affect vehicle driving and need to be recognized and avoided in a timely manner.

Content of the textual information includes image text descriptions sorted according to the target detection category priorities.

Step 106: processing the textual information using a large natural language model to obtain a perception decision-making result.

Exemplarily, the perception decision-making result includes: a vehicle control signal and corresponding explanatory information.

Utilizing the generalization and reasoning capabilities of the GPT 3.5 model, this embodiment can handle long-tail driving scenarios that are challenging for other approaches (the GPT model has sufficient common sense about the human society) while ensuring interpretability, allowing the autonomous driving system to think like a human. The GPT model outputs control signals (e.g., turn left, turn right, go straight, slow down and stop) and explanatory information (e.g., need to slow down and stop because the green light ahead turned red).

In addition, the method further includes a step of training the fusion module.

Figure 3:
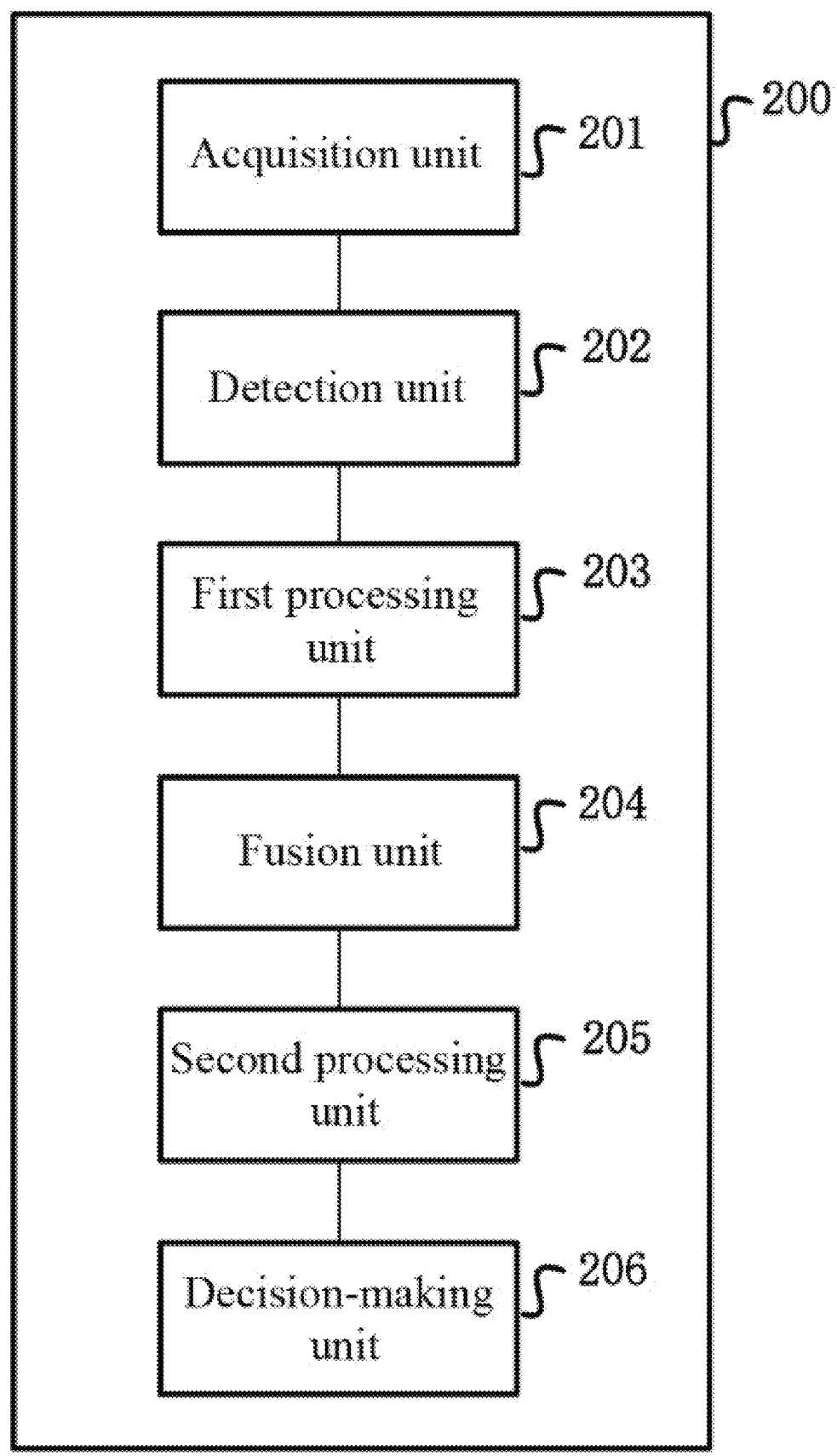
FIG. 3 is a functional structure diagram of a multimodal perception decision-making apparatus for autonomous driving based on an LLM provided in embodiments of the present application.

Based on the above embodiment, embodiments of the present application provide a multimodal perception decision-making apparatus for autonomous driving based on an LLM. Referring to FIG. 3, a multimodal perception decision-making apparatus 200 for autonomous driving based on an LLM provided in embodiments of the present application includes at least:
 an acquisition unit 201 configured to acquire an RGB image and an infrared image of a target area at current time;
 a detection unit 202 configured to process the RGB image using a target detection model to obtain a predicted bounding box and corresponding target detection categories;
 a first processing unit 203 configured to process the infrared image and the predicted bounding box and the corresponding target detection categories using a segmentation model to obtain a target mask image;
 a fusion unit 204 configured to fuse the RGB image, the target mask image and the infrared image using a fusion model to obtain a fused feature map;
 a second processing unit 205 configured to perform fusion processing on first prompt information representing a user intent, second prompt information representing target detection category priorities, and the fused feature map, using a large Vision-Language Model to obtain textual information; and
 a decision-making unit 206 configured to process the textual information using a large natural language model to obtain a perception decision-making result.

It should be noted that the principle by which the technical problems are solved by the multimodal perception decision-making apparatus 200 for autonomous driving based on an LLM provided in embodiments of the present application is similar to that of the method provided in embodiments of the present application. Therefore, for the implementation of the multimodal perception decision-making apparatus 200 for autonomous driving based on an LLM provided in embodiments of the present application, reference may be made to the implementation of the method provided in embodiments of the present application, and redundant details are not repeated here.

Figure 4:
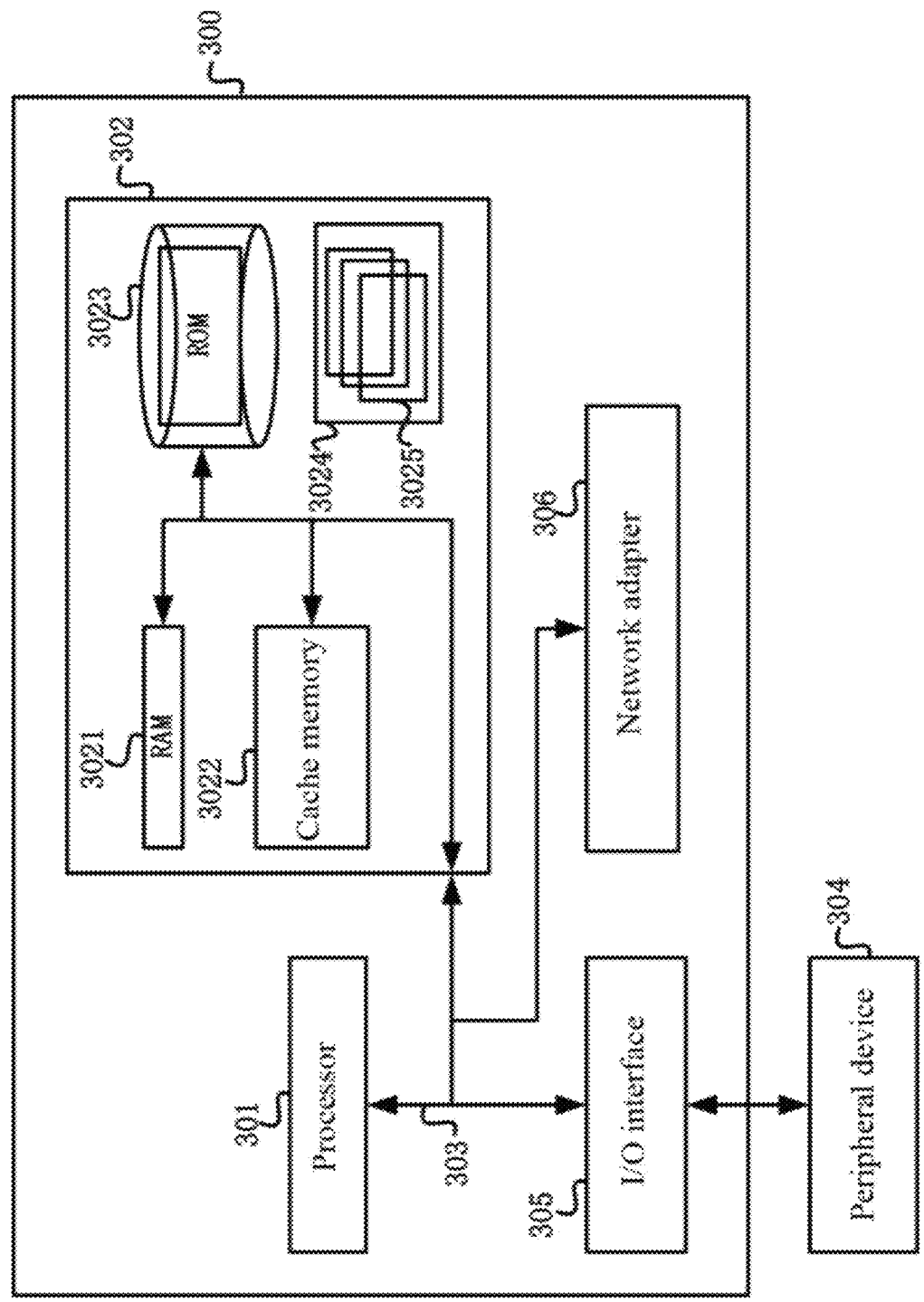
FIG. 4 is a functional structure diagram of an electronic device provided in embodiments of the present application.

Based on the above embodiment, embodiments of the present application also provide an electronic device. Referring to FIG. 4, an electronic device 300 provided in embodiments of the present application includes at least: a processor 301, a memory 302, and a computer program stored in the memory 302 and executable on the processor 301. When executing the computer program, the processor 301 implements the multimodal perception decision-making method for autonomous driving based on an LLM provided in embodiments of the present application.

The electronic device 300 provided in embodiments of the present application may also include a bus 303 connecting different components (including the processor 301 and the memory 302). The bus 303 represents one or more of several types of bus structures, including a memory bus, a peripheral bus, a local bus, etc.

The memory 302 may include a readable medium in the form of a volatile memory, such as a random access memory (RAM) 3021 and/or a cache memory 3022, and may further include a read only memory (ROM) 3023.

The memory 302 may further include a program tool 3025 with a set of (at least one) program modules 3024. The program modules 3024 include, but are not limited to, an operating subsystem, one or more application programs, other program modules, and program data. Each or some combination of the examples may include an implementation of a network environment.

The electronic device 300 may also communicate with one or more peripheral devices 304 (e.g., a keyboard, a remote control, etc.), and may also communicate with one or more devices (e.g., a mobile phone, a computer, etc.) that enable a user to interact with the electronic device 300, and/or communicate with any device (e.g., a router, a modem, etc.) that enables the electronic device 300 to communicate with one or more other electronic devices 300. Such communication may be performed through an input/output (I/O) interface 305. Furthermore, the electron device 300 may also communicate with one or more networks (e.g., a local area network (LAN), a wide area network (WAN), and/or a public network such as the Internet) through a network adapter 306. As shown in FIG. 4, the network adapter 306 communicates with other modules of the electronic device 300 through the bus 303. It should be understood that although not shown in FIG. 4, other hardware and/or software modules may be used in conjunction with the electronic device 300, including but not limited to: microcode, device drivers, redundant processors, external disk drive arrays, redundant arrays of independent disks (RAID) subsystems, tape drives, and data backup storage subsystems.

It should be noted that the electronic device 300 shown in FIG. 4 is only an example, and should not be construed as limiting the functions and scope of use of embodiments of the present application.

Embodiments of the present application also provide a computer readable storage medium. The computer readable storage medium stores computer instructions. The computer instructions, when executed by a processor, implements the multimodal perception decision-making method for autonomous driving based on an LLM provided in embodiments of the present application. Specifically, the executable program may be built-in or installed in the electronic device 300 such that the electronic device 300 may implement the multimodal perception decision-making method for autonomous driving based on an LLM provided in embodiments of the present application by executing the built-in or installed executable program.

The multimodal perception decision-making method for autonomous driving based on an LLM provided in embodiments of the present application may also be implemented as a program product, which includes a program code. When the program product is run on the electronic device 300, the program code is configured to cause the electronic device 300 to execute the multimodal perception decision-making method for autonomous driving based on an LLM provided in embodiments of the present application.

The program product provided in embodiments of the present application may be any combination of one or more readable media. Such a readable medium may be a readable signal medium or a readable storage medium. The readable storage medium may be, but is not limited to, an electronic, magnetic, optical, electromagnetic, infrared, or semiconductor system, apparatus or device, or any combination thereof. Specifically, more specific examples (a non-exhaustive list) of the readable storage medium include: an electrical connection with one or more conducting wires, a portable disk, a hard disk, a RAM, a ROM, an erasable programmable read only memory (EPROM), an optical fiber, a portable compact disc read-only memory (CD-ROM), an optical storage device, a magnetic storage device, or any suitable combination thereof.

The program product provided in embodiments of the present application may be a CD-ROM and includes a program code, and may also be run on a computing device. However, the program product provided in embodiments of the present application is not limited thereto. In embodiments of the present application, the readable storage medium may be any tangible medium containing or storing a program. The program may be used by or in combination with an instruction execution system, apparatus or device.

It should be noted that although a number of units or sub-units of the apparatus are mentioned in the detailed description above, this division is only exemplary and not mandatory. Indeed, according to implementations of the present application, features and functions of two or more of the units described above may be embodied in a single unit. Conversely, features and functions of one of the units described above may be further divided to be embodied by a plurality of units.

In addition, although the operations of the method of the present application are described in a particular order in the accompanying drawings, it is not required or implied that the operations must be performed in that particular order, or that all of the operations shown must be performed to achieve a desired result. Additionally or alternatively, certain steps may be omitted, a plurality of steps may be combined to be performed as one step, and/or one step may be broken down to be performed as a plurality of steps.

Finally, it should be noted that the above embodiments are only used for describing instead of limiting the technical solutions of the present application. Although the present application is described in detail with reference to the embodiments, those of ordinary skill in the art should understand that modifications or equivalent substitutions of the technical solutions of the present application without departing from the spirit and scope of the technical solutions of the present application should be encompassed within the scope of the claims of the present application.

What is claimed is:

1. A multimodal perception decision-making method for autonomous driving based on a large language model (LLM), comprising:
    acquiring a red green blue (RGB) image and an infrared image of a target area at a current time;
    processing the RGB image using a target detection model to obtain a predicted bounding box and corresponding target detection categories;
    processing the infrared image, the predicted bounding box and the corresponding target detection categories by using a segmentation model to obtain a target mask image;
    fusing the RGB image, the target mask image and the infrared image using a fusion model to obtain a fused feature map;
    performing fusion processing on first prompt information representing a user intent, second prompt information representing target detection category priorities, and the fused feature map, using a large Vision-Language Model to obtain textual information; and
    processing the textual information using a large natural language model to obtain a perception decision-making result;
    wherein the segmentation model comprises an image encoder, a prompt encoder and a mask decoder; and
    the step of processing the infrared image, the predicted bounding box and the corresponding target detection categories by using the segmentation model to obtain the target mask image comprises:
        processing the infrared image using the image encoder to obtain image embedding features;
        processing the predicted bounding box and the corresponding target detection categories using the prompt encoder to obtain prompt embedding features; and
        processing the image embedding features and the prompt embedding features using the mask decoder to obtain the target mask image containing a mask and semantic labels;
    wherein the fusion model comprises: a first convolutional layer, a second convolutional layer, a third convolutional layer, a fourth convolutional layer, a fifth convolutional layer, a sixth convolutional layer, a seventh convolutional layer, and an addition unit; and
    the step of fusing the RGB image, the target mask image and the infrared image using the fusion model to obtain the fused feature map comprises:

processing the infrared image using the first convolutional layer to obtain a first feature map;

processing the target mask image using the second convolutional layer to obtain a second feature map;

processing the RGB image using the third convolutional layer to obtain a third feature map;

processing the first feature map, the second feature map and the third feature map using the fourth convolutional layer to obtain a fourth feature map;

processing the fourth feature map using the fifth convolutional layer to obtain a fifth feature map;

processing the fifth feature map using the sixth convolutional layer to obtain a sixth feature map;

processing the RGB image, the target mask image and the infrared image using the seventh convolutional layer to obtain a seventh feature map; and adding together the sixth feature map and the seventh feature map using the addition unit to obtain the fused feature map.

2. The multimodal perception decision-making method according to claim 1, wherein the target detection category priorities are: traffic participants, road signs and traffic signals, and road obstacles.

3. The multimodal perception decision-making method according to claim 2, wherein a content of the textual information comprises image text descriptions sorted according to the target detection category priorities.

4. The multimodal perception decision-making method according to claim 1, wherein the perception decision-making result comprises: a vehicle control signal and corresponding explanatory information.

5. The multimodal perception decision-making method according to claim 1, further comprising a step of training the fusion model.

6. An electron device, comprising a memory, a processor, and a computer program stored in the memory and executable on the processor, wherein when executing the computer program, the processor implements the multimodal perception decision-making method according to claim 1.

7. A non-transitory computer readable storage medium, wherein the computer readable storage medium stores computer instructions, and the computer instructions are executed by a processor to implement the multimodal perception decision-making method according to claim 1.

8. The electron device according to claim 6, wherein in the multimodal perception decision-making method, the target detection category priorities are: traffic participants, road signs and traffic signals, and road obstacles.

9. The electron device according to claim 8, wherein in the multimodal perception decision-making method, a content of the textual information comprises image text descriptions sorted according to the target detection category priorities.

10. The electron device according to claim 6, wherein in the multimodal perception decision-making method, the perception decision-making result comprises: a vehicle control signal and corresponding explanatory information.

11. The electron device according to claim 6, wherein the multimodal perception decision-making method further comprises a step of training the fusion model.

12. The non-transitory computer readable storage medium according to claim 7, wherein in the multimodal perception decision-making method, the target detection category priorities are: traffic participants, road signs and traffic signals, and road obstacles.

13. The non-transitory computer readable storage medium according to claim 12, wherein in the multimodal perception decision-making method, a content of the textual information comprises image text descriptions sorted according to the target detection category priorities.

14. The non-transitory computer readable storage medium according to claim 7, wherein in the multimodal perception decision-making method, the perception decision-making result comprises: a vehicle control signal and corresponding explanatory information.

15. The non-transitory computer readable storage medium according to claim 7, wherein the multimodal perception decision-making method further comprises a step of training the fusion model.

* * * * *